Aug. 17, 1948.   F. C. MOCK   2,447,267
FUEL FEEDING SYSTEM

Filed Jan. 19, 1940   3 Sheets-Sheet 1

INVENTOR.
FRANK C. MOCK
BY
A. R. McCrady
ATTORNEY.

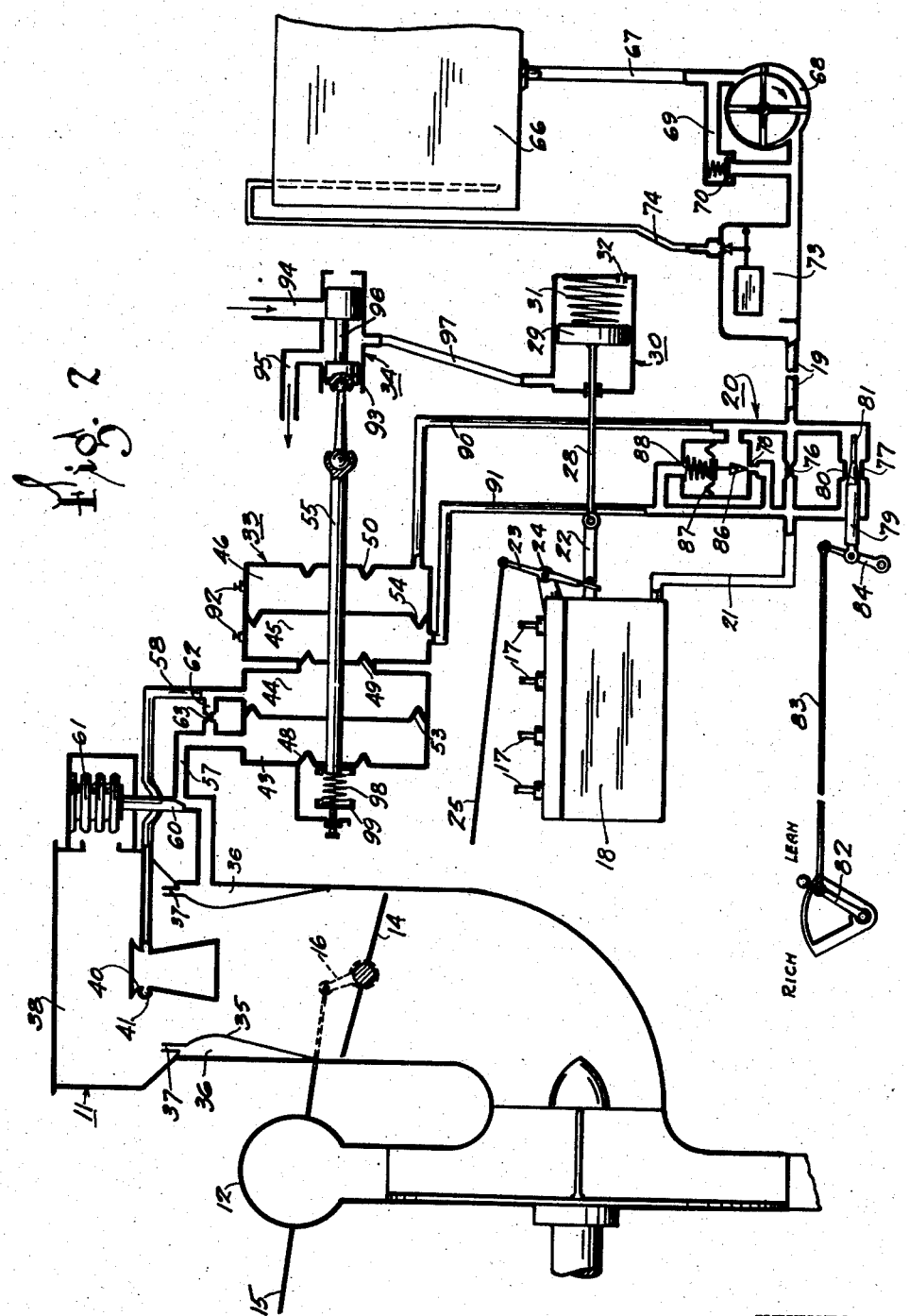

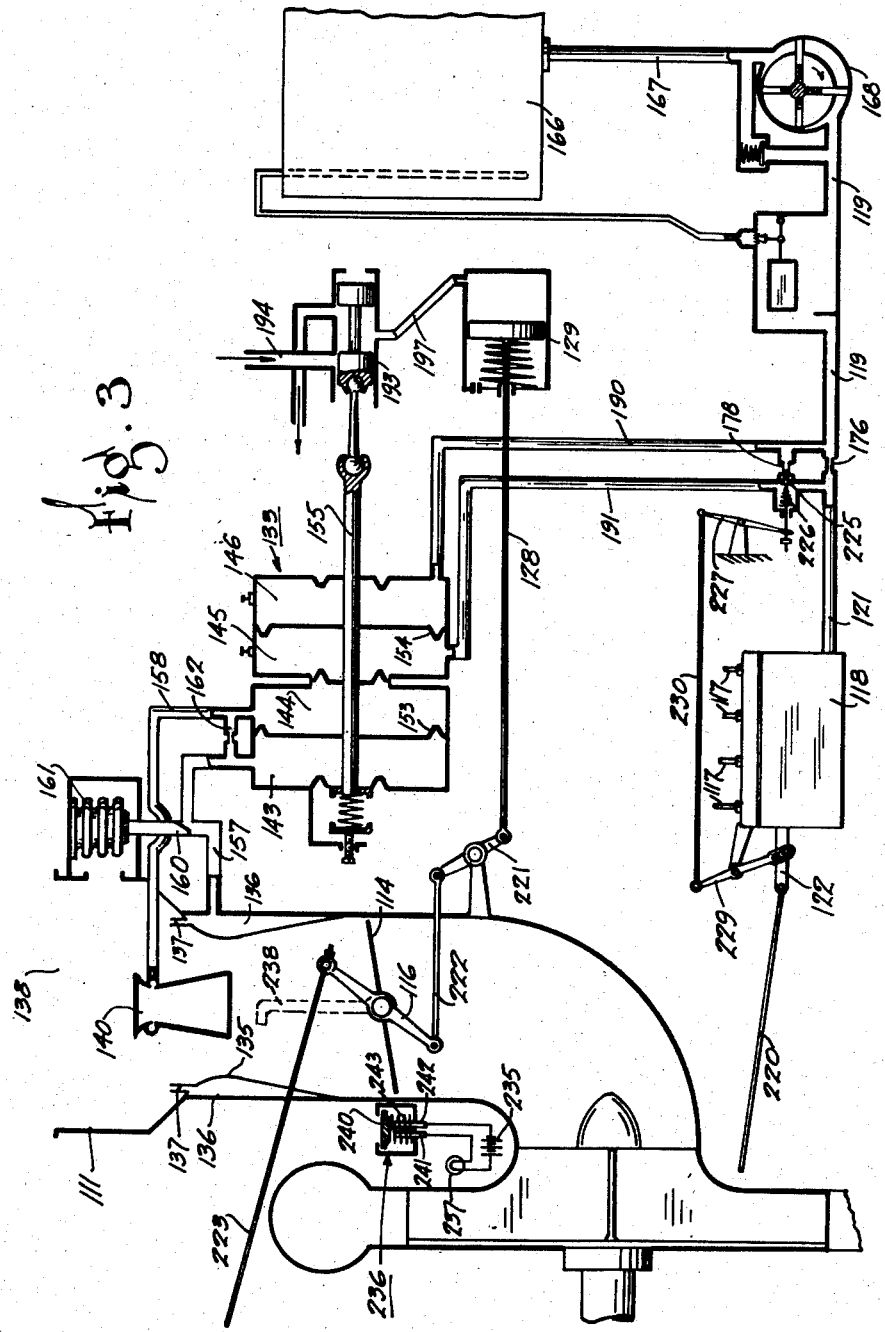

Patented Aug. 17, 1948

2,447,267

UNITED STATES PATENT OFFICE 2,447,267

FUEL FEEDING SYSTEM

Frank C. Mock, South Bend, Ind., assignor to Bendix Aviation Corporation, South Bend, Ind., a corporation of Delaware Application January 19, 1940, Serial No. 314,587

21 Claims. (Cl. 123—119)

This invention relates to fuel feeding systems for internal combustion engines, particularly of the solid-injection spark-ignition type in which the fuel injection pump intermittently supplies separate and distinct fuel charges to the cylinders of the engine in timed relation with the engine.

Heretofore, in engines of this type, considerable difficulty has been experienced in coordinating the fuel supply with the air supply under conditions of varying speed and load. Further difficulties are generally experienced when the engine is intended to operate at various altitudes, as in aircraft.

An object of the present invention is to provide a fuel control system for an engine of the fuel injection type in which the fuel and air are properly proportioned irrespective of speed and load.

Another object of the invention is to provide a fuel mixture control for an internal combustion engine of the solid injection type which will automatically deliver a correct fuel and air mixture under variable conditions of atmospheric pressure and temperature.

Another object of the invention is to provide a control for an engine of the fuel injection type in which the air supply to the engine is manually controlled and the fuel supply is regulated in accordance with the weight of air being supplied to the engine.

Another object of the invention is to provide a control for an engine of the fuel injection type in which the fuel supply is manually controlled and the air supply is varied in accordance with the rate at which fuel is supplied to the engine.

A further object of the invention is to provide a control for an engine of the fuel injection type in which the pilot can readily vary, between predetermined limits, the mixture ratio which the control is to automatically maintain.

A further object is to provide an improved fuel feeding system for an internal combustion engine of the solid-injection spark-ignition type.

Other objects and advantages will be readily apparent from the following detailed description taken in connection with the appended drawings in which:

Figure 2 is a diagrammatic sectional view of one modification of the invention in which the air throttle is controlled by the pilot and the fuel flow is automatically regulated; and Figure 3 is a diagrammatic sectional view of another modification in which the pilot directly controls the fuel supply and the air throttle is automatically operated.

Figure 1:
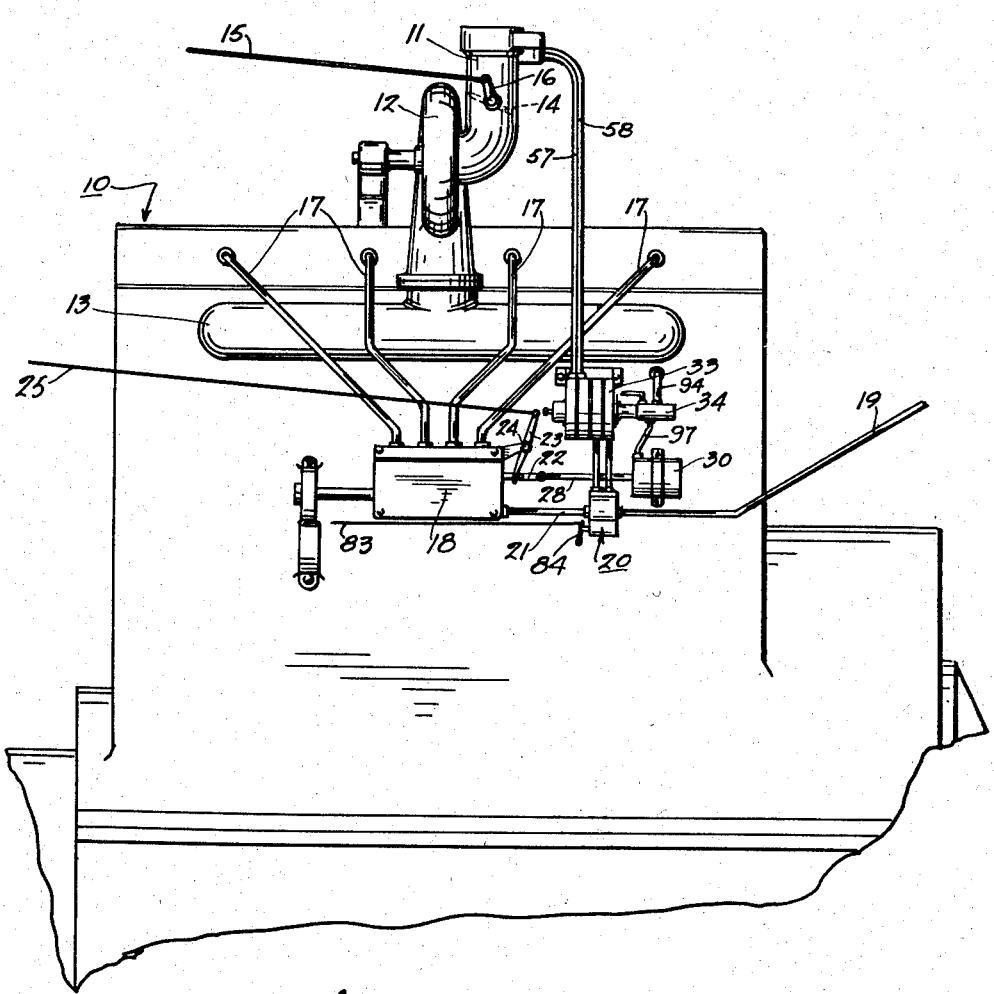
Figure 1 is a side elevation of an internal combustion engine embodying one form of my invention.

With particular reference to Figure 1 there is shown an internal combustion engine 10 to which the modification of my invention shown in Figure 2 has been applied. Air entering the engine through the air conduit 11, engine driven supercharger 12, and intake manifold 13 is variably controlled by a throttle 14 operated by the pilot through link 15 and lever 16.

Fuel is intermittently injected into the individual cylinders in timed relation with the engine through fuel conduits 17 by an engine driven fuel injection pump 18, driven by the engine in the customary manner. Fuel is supplied to the pump 18 through fuel conduit 19, fuel control unit 20 and conduit 21. The pump 18 may be of any desired type having a variable fuel delivery rate controlled by a control rod or link 22 which as shown is arranged to increase the fuel charge upon movement of the rod to the right and decrease it upon movement to the left. A lever 23, pivoted on a fixed member at 24, forms a one-way connection with the control rod 22 and is arranged to be operated by the pilot through link 25 for increasing the injection pump delivery during the starting operation. The control rod 22 is connected to one end of a link 28 having a piston 29, as shown in Figure 2, attached thereto at its other end reciprocally mounted in a control cylinder 30 and urged to the left by a compression spring 31. A vent 32 is provided in the right hand end of cylinder 30 and may be calibrated to control the air damping or dash-pot action on piston 29. Piston 29, and hence the rod 22, is variably controlled by means of a fuel control system comprising a metering unit 33 and a servomotor 34, the actuated member of which is piston 29, as will be explained hereinafter.

As shown in Figure 2, a venturi 35 is formed in the wall of the air conduit 11 anterior to the throttle and has an annular chamber 36 formed therein which communicates through tubes 37 with the air entrance 38 and is consequently subjected to the pressure of the entering air. A primary venturi 40 is positioned in the air conduit concentrically with the venturi 35 and has an annular chamber 41 formed therein communicating with the Venturi throat.

The metering unit 33, of the same general type as is disclosed in my copending application Serial No. 202,206, filed April 15, 1938, now Patent No. 2,390,658, is divided into four pressure chambers 43, 44, 45 and 46 by three small sealing diaphragms 48, 49, 50 and two large actuating diaphragms 53, 54, each of said diaphragms being fastened at its outer periphery to the metering unit casing and at its central portion to a rod 55. The diaphragms are formed with an annular groove to permit relatively free axial movement of rod 55 as is fully discussed in my above identified copending application. The chamber 43 communicates through conduit 57 with the annular chamber 36 in venturi 35 and is consequently subjected to the entering air pressure. The chamber 44 communicates through conduit 58 with the annular chamber 41 in venturi 40 and is consequently subjected to the depression at the Venturi throat. The conduit 57 is controlled by a valve 60 attached to and variably positioned by a sealed capsule or aneroid 61 exposed to the entering air and arranged to open conduit 57 at high barometric pressures (as at ground level) and to partially close the conduit at low pressures (as at high altitudes). The capsule 61 preferably contains air or other gas, so as to be responsive to variations in temperature as well as in pressure and may be partially filled with oil or other liquid for damping vibrations. The volume of the gas space enclosed by the bellows and the absolute pressure of the gas within the bellows are so correlated as to make the capsule directly responsive to changes in the density of the air entering the induction passage irrespective of whether the density change results from a change in the temperature or pressure of the entering air. In an oil damped bellows it has been found preferable to use an inert gas, such for example as nitrogen, within the bellows rather than air since oxygen slowly combines with the oil and consequently changes the calibration.

A passageway 62, having a calibrated restriction 63 therein, connects the conduit 58 with the conduit 57 at a point between the valve 60 and the chamber 43. The restriction 63 is relatively small and the bleeding of air therethrough during periods of operation has but a negligible effect upon the pressures in chambers 43 and 44 when valve 60 is in open position but has an increasing effect, tending to decrease the differential in pressure between said chambers, as the valve progressively closes, for reasons to be explained hereinafter.

A fuel supply tank 66 supplies fuel through conduit 67 to a low pressure fuel pump 68 of any known type, the one shown being a rotary sliding vane pump having a bypass passage 69 controlled by a spring pressed valve 70 for maintaining a substantially constant pump discharge pressure. Conduit 19 connects the pump 68 with the fuel control unit 20 and may include an air or vapor venting chamber 73, such as is disclosed in my copending application Serial No. 290,730, filed August 18, 1939, now Patent No. 2,414,158, having a float controlled vapor passage 74 leading back to the fuel tank. Since the fuel used in the majority of injection engines is generally of lower volatility characteristics than that used in carbureted engines, the fuel may have no tendency to form vapor in conduit 19 during operation at temperatures and pressures experienced with aircraft. When such is the case, the chamber 73 may be dispensed with. It will also be readily apparent that the low pressure pump 68 may be omitted in installations in which the supply tank is above the level of the injection pump 18 or in which the injection pump is capable of drawing in fuel against a negative head.

The fuel control unit 20, as shown in Figure 2, is comprised of three metering orifices 76, 77, 78 in parallel relationship interconnecting conduits 19 and 21. Metering orifice 76 is fixed in size and determines the minimum fuel flow or the lean mixture setting, as will be explained hereinafter. Orifice 77 is controlled by a valve 79 having a tapered portion 80 and a cylindrical end portion 81 and manually actuated by the pilot through mixture control lever 82, link 83 and lever 84. The orifice 77 is closed by valve 79 when the lever 82 is in the right-hand or lean position and is opened to the maximum as determined by the diameters of the orifice 77 and the cylindrical valve portion 81 when lever 82 is in the left-hand or rich position. It is obvious that fixed orifice 76 and variable orifice 77 could readily be replaced with a single orifice using a stepped metering rod for providing a minimum and maximum available metering area.

The orifice 78 is controlled by a valve 86 attached to a diaphragm 87 and normally urged in a direction to close orifice 78 by a compression spring 88. The upper side of diaphragm 87 is subjected to the fuel pressure in conduit 21 and the lower side to the fuel pressure in conduit 19. The differential in pressures on opposite sides of diaphragm 87 is therefore equal to the drop in pressure across the metering orifices, normally referred to as the fuel metering differential. Spring 88 is so designed, with reference to the area of diaphragm 87, as to yield and open valve 86 when the fuel metering differential reaches a predetermined value to thereby increase the available fuel metering area.

Conduit 90 communicates the chamber 46 of the metering unit 33 with the fuel conduit 19 (anterior to the metering orifices) and likewise conduit 91 communicates chamber 45 with the fuel conduit 21 (posterior to the metering orifices). Vent valves 92 are provided in chambers 45 and 46 to eliminate air and permit the chambers to fill with fuel.

Rod 55 of the metering unit 33 is connected through universal joints with a pilot or control valve 93 of the servomotor 34, which may be of any suitable design adapted for controlling the rod 22 of the injection pump 18, the one shown being of the motivating fluid type having a motivating fluid supply line 94 and a fluid return line 95. Pilot valve 93 is a cylindrical member having a relieved central portion 96, the ends of valve 93 being adapted to simultaneously uncover the fluid inlet 94 and cover the fluid return 95 upon movement of the valve to the right. A conduit 97 connects the servo-motor adjacent the relieved valve portion 96 with the left end of the control cylinder 30. It is readily apparent that upon progressive movement of valve 93 to the right the fluid pressure on piston 29 will increase and consequently move piston 29 and connected pump rod 22 progressively to the right in opposition to spring 31.

A light compression spring 98, located between the left end of metering unit control rod 55 and an adjustable spring support 99, urges rod 55 and attached valve 93 toward the right. The spring 98 although creating but a small force on control rod 55 is effective in producing a riching effect during idling, as will be explained hereinafter.

When the engine is in operation, air drawn through conduit 11 and venturis 35 and 40 will create a differential between the pressures in the air inlet 38 and the throat of venturi 40 which is proportional to the air velocity squared times the air density. Since the velocity of the air flowing through the air conduit is proportional to the weight of the air divided by the density, it is readily apparent that the venturi differential pressure is proportional to the square of the weight of air flowing divided by the density.

If the density be assumed constant, for purpose of explanation, the venturi differential pressure is then directly proportional to the square of the weight of air flowing. Under such assumed conditions of constant density it will be apparent that the air entrance pressure transmitted through tubes 37, annulus 36 and conduit 57 to chamber 43 and venturi throat pressure transmitted through annulus 41 and conduit 58 to chamber 44 will establish a differential in pressure across the diaphragm 53 and create a net force to the right on the control rod 55 which is directly proportional to the square of the weight of air flowing.

Under conditions of variable density it will be evident from the relationship given above between venturi differential, weight of air and density that the differential will increase with a decrease in density if the weight of air is maintained constant by increasing the air velocity. However, as the density is decreased, either by change in pressure or temperature, the capsule 61 expands and valve 60 partially restricts conduit 57 thereby increasing the effectiveness of the bleed passage 62 and reducing the differential pressure across diaphragms 53. By making capsule 61 responsive to variations in air density, irrespective of whether the variation is brought about by change in temperature or pressure as previously explained, and by properly forming the end of valve 60 the differential pressure across diaphragm 53, and consequently the force created thereby, is maintained in direct proportion to the square of the weight of air supplied to the engine irrespective of the air density.

The force created by air flow on control rod 55 if unopposed would move the rod and attached pilot valve 93 to the extreme right. However, as the valve moves to the right the inlet port 94 is uncovered and the pressure of the motivating fluid acting through conduit 97 on piston 29 moves the piston and attached injection pump control rod 22 to the right and increases the fuel pump delivery. With orifices 77 and 78 closed, the fuel received by the injection pump 18 flows through orifice 76 and results in a pressure drop across the orifice. Since the fuel density remains substantially constant at all conditions experienced, the pressure drop is directly proportional to the square of the weight of fuel flowing.

The fuel pressures anterior and posterior to the orifice 76 are communicated respectively through conduits 90 and 91 to chambers 46 and 45. The differential pressure so produced across diaphragm 54 results in a net force to the left on control rod 55 which is proportional to the square of the weight of fuel being supplied to the engine.

The control rod 55 will therefore move to the right under the action of the air force until the fuel flow increases to a point at which the fuel force acting on the control rod exactly equalizes the air force. Since the air force and fuel force are respectively proportional to the squares of the weights of air and fuel flowing it is apparent that the air-fuel ratio will be maintained constant, unless this equilibrium of forces is disturbed by some extraneous means such as the idle spring 98. The force of the idle spring acting to the right, in addition to the air force, is effective to create a somewhat greater fuel flow and consequently a richer mixture than would be expected from the air force alone. At low air flows the force of spring 98 represents a relatively large percentage of the air force and consequently results in a fairly large percent enrichment. However, as the air flow increases the force of spring 98 becomes a lesser and lesser percentage of the air force, consequently decreasing the percent enrichment. Such an arrangement produces a rich mixture for idling conditions as is desired.

In order to start the engine the pilot opens the throttle valve 14 while the engine is being cranked and the air differential resulting from the induced air flow will move control rod 55 to the right uncovering the motivating fluid inlet 94. If motivating fluid under pressure is available at this time, the pump control rod 22 will be moved to a partially open position and the engine will start. However, if the motivating fluid pump is engine driven there will probably be insufficient pressure available during the cranking operation to overcome the force of the spring 31 tending to move the control rod 22 toward closed position. For this reason link 25 and attached lever 23 are provided to enable the pilot to manually increase the injection pump delivery to correspond with the air induced by the engine during cranking and permit the engine to start.

The orifice 77 and cooperating mixture valve 79 are provided to give the pilot a limited control of the actual mixture ratio being delivered to the engine. By opening valve 79 the total available fuel metering area is increased and since the metering unit 33 establishes an equilibrium between the air differential and the fuel differential irrespective of the actual amount of fuel flowing, an increase in the metering area without change in metering differential results in additional fuel and consequently a richer mixture.

It is generally known that when the horsepower developed by the engine exceeds a predetermined amount it is desirable to provide an enriched mixture. This is accomplished in the present invention by means of the valve 86 controlling orifice 78. As the air flow increases the air differential and consequently the fuel differential increases as previously explained. When the fuel differential acting across diaphragm 87 reaches a predetermined amount spring 88 will yield and permit valve 86 to open. Upon opening of the valve, and the accompanying increase in metering area, the fuel differential tends to decrease and as a result control rod 55 moves to the right thereby increasing the delivery from the injection pump 18 until the fuel differential is again established equal to the air differential.

It should be noted that since the fuel differential pressure across the economizer diaphragm 87 is maintained equal to the differential pressure across the air diaphragm 53, the economizer valve 86 will open when the weight of air being delivered to the engine reaches a predetermined value irrespective of the altitude or the actual mixture ratio being supplied to the engine.

The modification shown in Figure 3 is similar in many respects to that of Figure 2 and differs therefrom primarily in the fact that the pilot directly controls the injection pump delivery rather than the air throttle, the latter being controlled by means of the metering unit and associated servo-motor. Since the structures of the two modifications are so similar, corresponding parts are identified by corresponding reference numerals with the addition of 100.

As before, fuel is received by the injection pump 118 from the fuel tank 166 through conduit 167, fuel pump 168, conduit 119, metering orifice 176 and fuel conduit 121. The quantity of fuel injected into the engine through conduits 117 is directly controlled by the pilot through the rod 220 attached to the pump control rod 122.

The pressure at the throat of venturi 140 is transmitted to chamber 144 of the metering unit 133 through the conduit 158 and the pressure in the air entrance 138 is transmitted to chamber 143 through tubes 137, annular chamber 136, and conduit 157. Capsule 161 and attached valve 160 control the conduit 157 and thereby, as before, vary the effectiveness of the calibrated bleed passage 162. The air throttle 114 is controlled by the servo-motor actuated piston 129 through link 128, pivoted lever 221, link 222, and throttle lever 116. A rod 223 having a one-way connection with the throttle lever 116 extends from the pilot's cockpit to permit partially opening the throttle during the cranking period.

As previously explained, fuel flowing to the injection pump creates a fuel differential pressure across the metering orifice 176 and consequently across the diaphragm 154, resulting in a force to the left on the control rod 155 which is proportional to the amount of fuel flowing through the orifice 176. Similarly, air flowing through the induction passage 111 creates a differential pressure across diaphragm 153 and consequently establishes a force to the right on control rod 155 which is proportional to the weight of air flowing.

During operation the pilot regulates the fuel being delivered to the engine by means of rod 220. The fuel received by the pump creates a force on the control rod 155 urging it and the attached servo-motor control valve 193 to the left and uncovering the motivating fuel inlet 194. Pressure of the motivating fluid transmitted through conduit 197 acts on the piston 129 urging it to the left and opening the throttle 114. If the fuel force on control rod 155 were unopposed, rod 155 would move to the left and fully uncover the motivating fluid inlet 194 thus opening the throttle 114 to the wide open position. However, as the air flow increases the resulting air force on control rod 155 opposing the fuel force also increases. As a result the throttle 114 is opened sufficiently to create an air differential force which balances the fuel differential force. A constant mixture ratio is thus maintained.

The economizer orifice 178 in Figure 3 is controlled by a valve 225 urged to the right against its seat by a compression spring 226 and is arranged to be opened by the lever 227 having a one-way connection with the stem of valve 225. Lever 227 is operated by the pump control rod 122 through lever 229 and link 230 and is arranged to open the valve 225 when the pump rod 122 is opened a predetermined amount. This type of economizer arrangement produces a richened mixture when the fuel charge per stroke exceeds a predetermined amount.

Valve 225 is preferably of a slow opening type for reasons which will be apparent from the following explanation. Since the fuel flow is determined by the engine speed and the position of the pump control rod 122, a sudden opening of valve 225 when the control rod reaches a predetermined position would suddenly increase the metering area and consequently decrease the fuel metering differential pressure. Such a sudden decrease in fuel differential pressure transmitted to the metering unit 133 would result in movement of the control rod 155 to the right, partially closing the throttle. The enrichment would therefore be obtained by a decrease in the air flow rather than an increase in the fuel flow. By making the valve 225 of a slow opening type the pump delivery increases sufficiently as valve 225 opens to produce an increasing fuel differential pressure and consequently a simultaneous throttle opening action.

It will be apparent that the economizer valve arrangements shown in Figures 2 and 3 could readily be interchanged. Furthermore, although no arrangement for mixture control by the pilot is shown in Figure 3, it will be apparent that the arrangement shown at 77 in Figure 2 is equally applicable to the modification of Figure 3.

It is generally known that the weight of air consumed by an engine at wide open throttle is less at high altitude than at a lower altitude or at ground level. Therefore as the pilot moves the pump control rod to the left to increase the fuel pump delivery at high altitude the throttle 114 will simultaneously open and will reach a wide open position before the pump control rod reaches its wide open position. Further opening of the fuel control rod at this time would increase the fuel flow without corresponding increase in air flow and consequently the mixture would be greatly richened. To prevent the occurrence of such enrichment various structures, such for example as that shown in my copending application Serial No. 123,063, filed January 29, 1937, now Patent No. 2,426,740, might be used. In the present application I propose to use structure described hereinafter which, although not preventing such an enrichment as does the structure of the above copending application, will indicate to the pilot that the throttle has reached its wide open position.

The proposed structure includes an electrical circuit comprising a source of electrical energy 235, a switch indicated at 236, and a tell-tale light or instrument 237 conspicuously mounted on the instrument panel in the pilot's cockpit. A lever 238 rigidly attached to the shaft of the throttle valve 114 is arranged to engage the switch disc 240 forcing it downwardly to complete the circuit between the contacts 241 and 242 as the throttle reaches the wide open position. A compression spring 243 normally urges disc 240 upwardly to break the circuit. Operation of the tell-tale light therefore indicates to the pilot that the throttle has reached wide open position and further movement of the link 220 to the left will merely produce a richened mixture without additional air flow.

A portion of the subject matter disclosed but not claimed herein is being claimed in my copending application Serial No. 362,572, filed October 24, 1940, a continuation-in-part of application Serial No. 118,718, filed January 2, 1937, now abandoned, and in the copending application of Guy E. Beardsley, Jr., Serial No. 302,749.

Although the invention has been described with particular reference to but two modifications, the invention is not limited thereto or otherwise except in accordance with the subjoined claims.

I claim:

1. A fuel and air supply system for an engine comprising a main air supply passage, a throttle therein, a venturi in said passage for creating an air differential pressure, means jointly responsive to variations in the pressure and temperature of the air in the passage for modifying said air differential pressure, a variable delivery fuel injection pump for intermittently injecting charges of fuel into the engine in timed relation therewith, and means responsive to said modified air differential pressure for varying the fuel pump delivery.

2. A system for supplying fuel and air to an engine comprising a main air supply passage having a throttle, a venturi in said air passage anterior to the throttle for creating an air differential pressure, a fuel injection pump for intermittently injecting separate and distinct charges of fuel into the respective combustion chambers of the engine in timed relation therewith and having a control for varying the quantity of fuel in said charges, a conduit for supplying fuel to the pump, area restricting means in said conduit for creating a fuel differential pressure, and means responsive to said air and fuel differential pressures for actuating said pump control.

3. The invention defined in claim 2 comprising in addition means for varying the effective area of said area restricting means.

4. The invention defined in claim 2 comprising in addition means responsive to the fuel differential pressure for varying the effective area of the area restricting means.

5. In a fuel mixture control for an internal combustion engine, an air passage, a fuel conduit, a throttle for controlling the flow through the air passage, a servo-motor actuated means for controlling the flow through the fuel conduit, and means responsive to the resultant of opposed forces created by air and fuel pressures varying in accordance with the flow through said air passage and fuel conduit for controlling the servo-motor.

6. In a fuel feeding system for an internal combustion engine, an air passage, a venturi therein, a manually operable throttle in the passage, a fuel conduit, a fuel injection pump for delivering separate and distinct fuel charges to the engine, a servo-motor having a control member and an actuated member, means for varying the fuel delivery from said pump connected to said actuated member, and means responsive to air pressures respectively derived from the entrance to and the throat of said venturi and to fuel pressures at spaced points in the fuel conduit for controlling the servo-motor control member.

7. The invention defined in claim 6 comprising in addition means responsive to variations in the temperature and pressure of the air in the air passage for modifying said air pressures.

8. In a system for supplying fuel and air to a fuel injection engine, a main air supply conduit, a venturi therein, a fuel injection pump, a fuel conduit for supplying fuel to said pump, a metering element in said fuel conduit, a servo-motor having a control member and an actuated member, means for varying the fuel delivery from the pump connected to said actuated member, a plurality of diaphragms operatively connected to each other and to the control member, two oppositely disposed sides of said diaphragms being respectively connected to the fuel conduit on opposite sides of the metering element, and connections from the other two sides of said diaphragms to the air conduit and venturi respectively.

9. In a system for supplying fuel and air to a fuel injection engine, a main air supply passage, a venturi in said air passage for creating an air differential pressure, a fuel injection pump for intermittently delivering separate and distinct fuel charges to the individual engine cylinders, a control for varying the quantity of fuel delivered by said pump, yielding means urging the control in a direction to decrease the pump delivery, power actuated means for urging the control in a direction to increase the pump delivery, and means responsive to the air differential pressure for controlling the power actuated means.

10. In a fuel feeding system for a fuel injection engine, an injection pump adapted to be driven in timed relation with the engine for intermittently injecting charges of fuel into a combustion chamber of the engine, a fuel conduit for supplying the pump with fuel, area restricting means in said conduit for creating a fuel differential pressure, an air passage, a throttle in the passage and means responsive to said fuel differential pressure for opening the throttle upon increase in said fuel differential pressure.

11. In a fuel feeding system for a fuel injection engine, a fuel injection pump, a conduit for supplying fuel to said pump, means for varying the quantity of fuel delivered by said pump, an air conduit, a throttle in the air conduit, and means responsive to pressures variable with variations in flow through said conduits for controlling said throttle.

12. In a fuel feeding system for a fuel injection engine, a fuel injection pump, a conduit for supplying fuel to said pump, area restricting means in said conduit for creating a fuel differential pressure, manually operable means for varying the flow through said conduit, an air passage, a venturi in said passage for creating an air differential pressure, means including an element responsive to variations in the temperature and pressure of the air in said air passage for producing a modified air differential pressure, and means jointly responsive to the fuel differential pressure and to the modified air differential pressure for controlling the flow through the air passage.

13. In a fuel injection system for an internal combustion engine, a fuel injection pump, a fuel conduit for supplyng fuel to the pump, a manual control for the fuel pump, a metering element in said fuel conduit, an air conduit and a throttle therefor, a venturi in the air conduit, and means responsive to fuel pressures anterior and posterior to the metering element and to venturi pressure for operating the throttle.

14. In a fuel injection system for an internal combustion engine, a fuel pump, an air conduit and a throttle therefor, manual means for controlling the fuel pump, automatic means for controlling the throttle to increase the air flow as the fuel is increased, and a throttle-position indicator located at a point remote from the engine whereby the operator is apprised when the throttle is in substantially wide open position.

15. In a fuel system for an internal combustion engine, a fuel pump, a fuel conduit for supplying fuel to the pump, manually operable means for controlling the fuel pump, area restricting means in said conduit for creating a fuel differential pressure, an air conduit, a throttle in the air conduit, means responsive to said fuel differential pressure for controlling said throttle, an electrical circuit having a light bulb therein, means for completing the circuit, and means for actuating said completing means at substantially wide open throttle.

16. In a fuel system for an internal combustion engine, a fuel injection pump, a fuel conduit for supplying fuel to the pump, area restricting means in the fuel conduit for creating a fuel differential pressure, manually actuated means for controlling the pump, an air conduit and a throttle therefor, a servo-motor, means actuated by the servo-motor for controlling the throttle, and means responsive to the fuel differential pressure for controlling the servo-motor and adapted to open the throttle upon increase in the fuel differential pressure.

17. In a fuel system for an internal combustion engine, a fuel injection pump, a conduit for supplying fuel thereto, a pump control, an air conduit and a throttle therefor, a servo-motor having a control member and an actuated member, a connection from the actuated member to the throttle, and means responsive to pressures created by flow through said air and fuel conduits for operating the servo-motor control member.

18. In a fuel system for an internal combustion engine, a fuel injection pump, a fuel conduit connecting the pump and a source of fuel, a fuel metering element in the conduit creating a fuel differential pressure, an air conduit, means in said air conduit for creating an air differential pressure variable in response to variations in air flow therethrough, a servo-motor having a control member and an actuated member, means connected to said actuated member for varying the flow through the air conduit, and means responsive to the fuel and air differential pressures for controlling the servo-motor control member.

19. In a fuel and air supplying system for an internal combustion engine, a fuel conduit for supplying fuel to the engine, an air conduit for supplying air to the engine, a throttle in the air conduit, a venturi in said air conduit, a pair of chambers connected to the venturi and air conduit respectively, means including a sealed capsule responsive to variations in the temperature and pressure of the air supplied to the engine for modifying the differential in the pressures in said chambers, a calibrated restriction in the fuel conduit, power actuated means for controlling the throttle, and means responsive to fuel pressures anterior and posterior to said calibrated restriction and to the pressures in the said chambers for controlling said power actuated means.

20. In a fuel feeding system for an internal combustion engine, a fuel conduit for supplying fuel to the engine, an air conduit for supplying air to the engine, manually operable means for varying the flow through the fuel conduit, a throttle for varying the flow of air through the air conduit, means creating a differential pressure variable in response to variations in the flow through the fuel conduit, means creating a differential pressure in the air conduit, power actuated means for operating the throttle, means responsive to said differential pressures for controlling the power actuated means, an electrical circuit having a light bulb and a switch, and means for closing said switch when the throttle approaches wide open position.

21. In a charge forming device for an engine, an air passage supplying air to the engine, a throttle controlling the passage, a fuel conduit supplying fuel to the engine, a movable wall connected to the throttle for operating it, and means for subjecting said wall to fluid pressure varying in accordance with variations in the rates of air and fuel flow to the engine.

FRANK C. MOCK.

REFERENCES CITED

The following references are of record in the file of this patent:

UNITED STATES PATENTS

| Number | Name | Date |
| --- | --- | --- |
| 1,363,513 | Keith | Dec. 28, 1920 |
| 1,894,510 | Ensign | Jan. 17, 1933 |
| 1,955,037 | Viel | Apr. 17, 1934 |
| 2,004,869 | Hogg | June 11, 1935 |
| 2,010,420 | Simmon | Aug. 6, 1935 |
| 2,025,091 | Chandler | Dec. 24, 1935 |
| 2,091,163 | Schweizer | Aug. 24, 1937 |
| 2,103,126 | Sugihara | Dec. 21, 1937 |
| 2,125,886 | Chandler | Aug. 9, 1938 |
| 2,129,613 | Wunsch et al. | Sept. 6, 1938 |
| 2,139,981 | Sugihara | Dec. 13, 1938 |
| 2,150,075 | Menneson | Mar. 7, 1939 |
| 2,161,743 | Heinrich et al. | June 6, 1939 |
| 2,165,447 | Browne | July 11, 1939 |
| 2,177,120 | Schaeren | Oct. 24, 1939 |
| 2,189,475 | Saur | Feb. 6, 1940 |
| 2,217,364 | Halford et al. | Oct. 8, 1940 |
| 2,269,294 | Udale | Jan. 6, 1942 |
| 2,281,411 | Campbell | Apr. 28, 1942 |
| 2,297,213 | Gosslau et al. | Sept. 29, 1942 |
| 2,341,257 | Wunsch | Feb. 8, 1944 |

FOREIGN PATENTS

| Number | Country | Date |
| --- | --- | --- |
| 392,345 | England | May 18, 1933 |
| 429,081 | England | May 23, 1935 |
| 367,310 | Italy | Jan. 20, 1939 |

Certificate of Correction

Patent No. 2,447,267.

August 17, 1948.

FRANK C. MOCK

It is hereby certified that errors appear in the printed specification of the above numbered patent requiring correction as follows:

Column 8, line 69, beginning with "1. A fuel and" strike out all to and including the word and period "means." in column 10, line 5, comprising claims 1 to 9 inclusive; for the claims now appearing in the patent as 10 to 21 inclusive read 1 to 12 respectively; in the heading to the printed specification, line 7, for "21 Claims" read *12 Claims*; column 12, line 2, strike out "in" after "pressure" and insert instead *variable in response to variations in the flow through*;

and that the said Letters Patent should be read with these corrections therein that the same may conform to the record of the case in the Patent Office.

Signed and sealed this 25th day of January, A. D. 1949.

[SEAL]

THOMAS F. MURPHY,
*Assistant Commissioner of Patents.*